US008902579B1

(12) United States Patent
Lalouette

(10) Patent No.: US 8,902,579 B1
(45) Date of Patent: Dec. 2, 2014

(54) DRIVE BIAS AND DAMPING FOR TRAYLESS DISK DRIVE ENCLOSURES

(75) Inventor: Marc J. Lalouette, Laguna Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 164 days.

(21) Appl. No.: 13/409,008

(22) Filed: Feb. 29, 2012

(51) Int. Cl.
*H05K 5/00* (2006.01)
*H05K 7/00* (2006.01)
*G06F 1/16* (2006.01)

(52) U.S. Cl.
USPC ............ 361/679.37; 361/679.33; 361/679.38; 361/679.39; 361/724; 361/725

(58) Field of Classification Search
USPC ............. 361/679.37, 679.38, 679.39, 679.33, 361/724, 725
See application file for complete search history.

(56) References Cited

U.S. PATENT DOCUMENTS

| | | | | |
|---|---|---|---|---|
| 5,777,845 A * | 7/1998 | Krum et al. | ............... | 361/679.34 |
| 6,134,113 A | 10/2000 | Mills et al. | | |
| 6,804,877 B2 * | 10/2004 | Mueller et al. | ............. | 29/603.03 |
| 7,685,613 B2 * | 3/2010 | Permut et al. | ................. | 720/657 |
| 8,508,930 B2 * | 8/2013 | Peng et al. | ............... | 361/679.33 |

* cited by examiner

*Primary Examiner* — Anthony Haughton

(57) ABSTRACT

A disk drive enclosure may comprise a tray-less chassis comprising a backplane and defining an opening configured to receive a disk drive. A door may be coupled to the tray-less chassis and configured to enclose the disk drive within the opening when the door is closed. An elastomeric element may be configured to bias the disk drive against the backplane when the door is closed and may be further configured to provide damping so as to dissipate energy imparted to the tray-less chassis during the operation of the disk drive.

22 Claims, 4 Drawing Sheets

DRIVE BIAS AND DAMPING FOR TRAYLESS DISK DRIVE ENCLOSURES

BACKGROUND

In the field of computers, particularly in the area of servers, disk drive user serviceability is an important factor. The highest form of serviceability involves hot swapping, whereby a drive can be removed and replaced without powering off the unit or taking it offline. Redundant Array of Inexpensive Disks (RAID) level 5 allows any individual failed drive to be removed, and the data stored thereon to be rebuilt on the fly from the remaining disk drives. Historically, server products have used SCSI drives. The connectors used on such SCSI drives require high insertion forces and good mechanical registration, which drove the requirement for a drive tray that incorporated guidance and a camming mechanism to generate the high insertion forces required for properly seating the drive within the enclosure. With the advent of the SATA and SAS connectors, however, drive locational tolerances were relaxed and insertion forces were lowered. This enabled drive mounting without the need for a drive tray mechanism, and ushered in the advent of the tray-less chassis, which offer the customers the advantage of simplified drive replacement.

One requirement that has remained is the need for good mechanical stability of the drive within the chassis. Quite to the contrary, with increasing drive track pitch and areal density, the stability of the mounting is becoming increasingly important. Tray-less designs offer the benefit of improved mounting integrity by virtue of having fewer parts between the chassis and the drive, each of which creates inherent tolerance stack-ups and reduced stiffness. Some prior tray-less designs have incorporated a metal spring into the door of the enclosure to provide some level of axial clamping force on the drive.

Due to the nature of disk drives, as the drive's Voice Coil Motor (VCM) causes the actuator assembly or assemblies within the drive to pivot at high speed, vibrational energy is imparted to the base casting of the disk drive, which is then transferred to the chassis and to the other drives within the enclosure. However, springs, by their very nature, store and release energy imparted to them. Therefore, the vibrational energy generated during the operation of the drive is alternately stored and released by the spring on the door of the chassis of the enclosure, making it more difficult for the enclosed drives to accurately seek and track follow.

DETAILED DESCRIPTION

Figure 1:
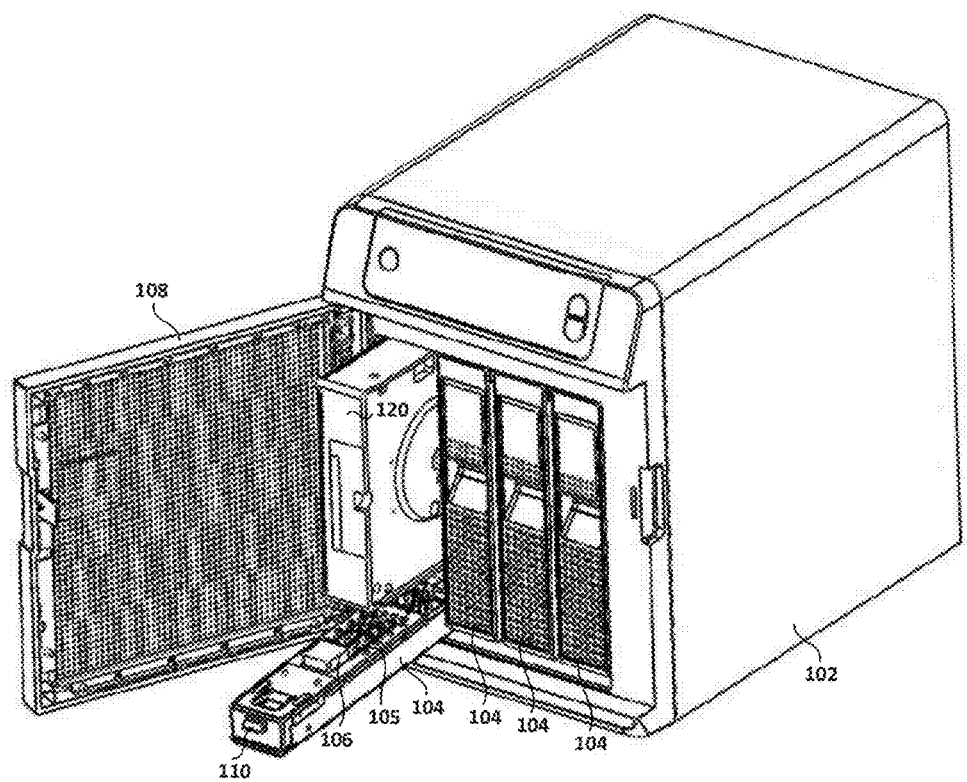
FIG. 1 shows a multi disk drive enclosure, according to one embodiment.

FIG. 1 shows a multi-disk drive disk drive enclosure 102, according to one embodiment. The multi-drive enclosure may be a Network Attached Storage (NAS), a Storage Area Network (SAN), Just a Bunch of Disks (JBOD) or any other configuration of a multi-drive assembly. As shown, the multi-disk drive enclosure 102 may define one or more openings configured to receive a disk drive, such as disk drive 120. The enclosure 102 may also, as shown in FIG. 1, comprise one or more doors 104 coupled to the tray-less chassis of the enclosure 102 and configured to enclose the disk drive 120 within the opening defined therein when closed. In the exemplary embodiment shown in FIG. 1, the doors 104 are pivotally coupled to tray-less chassis of the enclosure 102. The doors 104 may be configured to open by pivoting, thereby exposing the opening into which the disk 120 may be slid until the connectors thereof mate with corresponding connectors on the backplane of the tray-less chassis. When the disk drive 120 is at least partially inserted within the opening, the door 104 may be pivoted to its closed position. In so doing, a portion of the interior surface 105 of the door 104 may come into contact with the disk drive 120 and may urge the disk drive 120 further into the opening, further seating the disk drive 120 within the enclosure 102. An enclosure door 108 may enclose the plurality of disk drives 120 within the enclosure 102.

As shown at 106 in FIG. 1, an elastomeric element 106 may be coupled to the door 104. More particularly, the elastomeric element 106 may be coupled, through a layer of adhesive, for example, to the interior surface 105 of the door 104. As the door 104 is pivoted to its closed position in which it encloses the disk drive 120 within the opening, and is latched closed by a latching mechanism 110, the elastomeric element 106 comes into contact with a facing surface of the disk drive 120 and biases the disk drive 120 against the backplane of the tray-less chassis. In this configuration, the elastomeric element 106 provides damping so as to dissipate energy imparted to the tray-less chassis during operation of the disk drive(s) 120.

The elastomeric element 106 may assume most any shape. In the embodiment of FIG. 1, the elastomeric element is shaped as a solid rectangle. For example, the elastomeric element 106 may be about 6 to 20 millimeters (mm) in length and width and about 2 to 20 mm in height. For instance, the elastomeric element 106 may be about 15 mm in width and about 15 mm in length and about 8 mm in height. Those of skill in this art, however, will readily recognize that other shapes, dimensions, compositions of the elastomeric element 106 are possible and should be adapted to the envisaged application, available space, clearance operating environment, anticipated static load and vibrations.

According to one embodiment, the elastomeric element 106 may comprises a loss modulus that is higher than a loss modulus of steel. For example, in one embodiment, the elastomeric element 106 comprises a thermoset polymer. According to one embodiment, the thermoset polymer may comprise, for example, ethylene propylene diene monomer (EPDM) rubber. Those of skill in this art will also recognize that other materials may be suitable for the elastomeric element 106 such as, for example, a silicone rubber. In fact, any other suitable dampening material may be used, depending upon the application.

Figure 2:
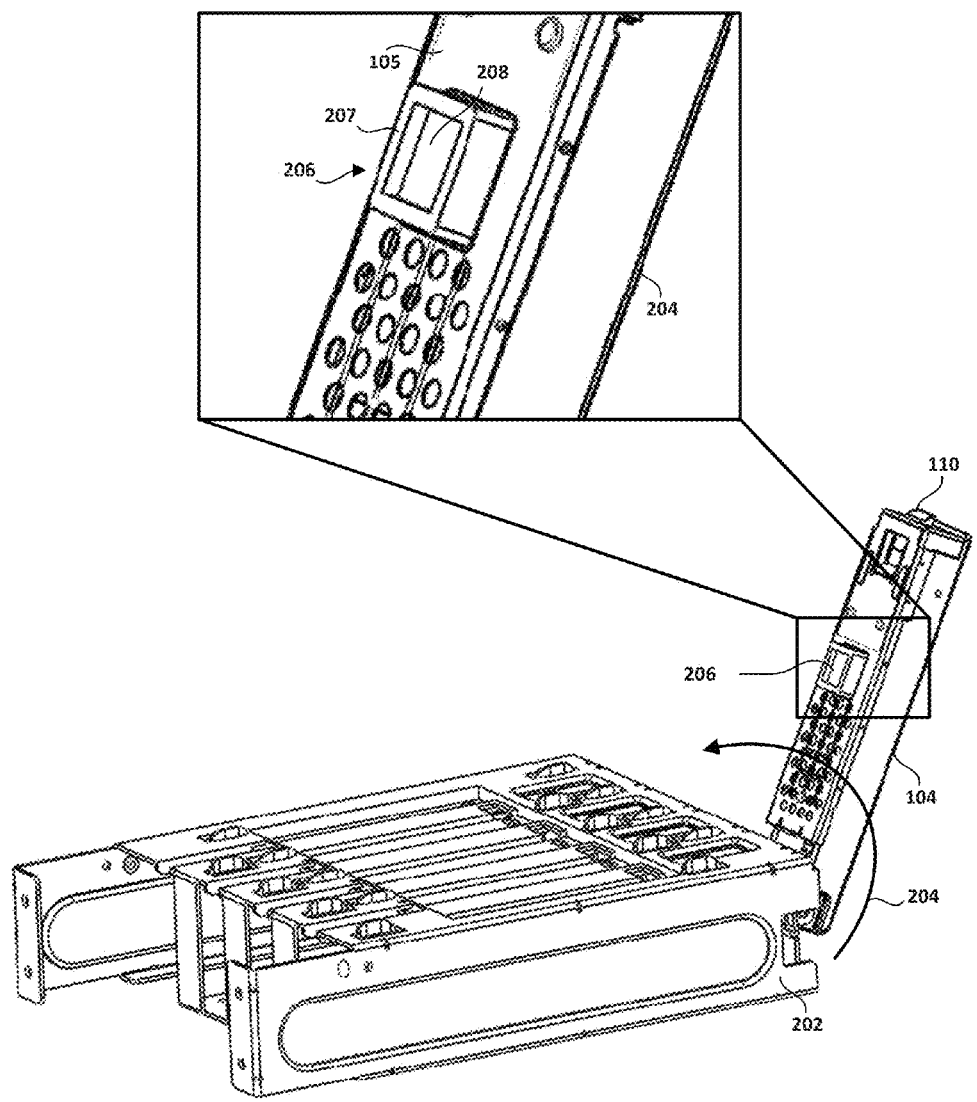
FIG. 2 shows a view of a portion of a tray-less chassis and a detail of the elastomeric element coupled to the door, according to one embodiment.

FIG. 2 shows a view of a portion of a tray-less chassis 202 and a detail of an elastomeric element 206 coupled to the door 104 of the enclosure 102, according to one embodiment. FIG. 2 shows the door 104 pivotally coupled to the tray-less chassis 202. Arrow 204 is suggestive of the pivot of the door 104 as it closes to enclose and secure the disk drive (not shown in FIG. 2). However, the doors 104 may also be linearly coupled to the tray-less chassis 202, with the doors 104 being configured to slid open and shut. The tray-less chassis 202 of FIG. 2 is configured to receive four drives 120 and to include four doors 104, although only one door 104 is shown in FIG. 2, for clarity of illustration. Coupled to the interior surface 105 of the door 104 is an elastomeric element 206. As shown, elastomeric element 206 defines a compressible wall extending 207 around a perimeter of a center portion to define a void 208 at the center portion that is bounded by the compressible wall 207. The compressible wall 207, for example, may have a thickness of about 0.5 to about 4 mm. For example, the compressible wall 207 may have a thickness of about 1 to 4 mm. According to one embodiment, the compressible wall 207 may have a thickness of about 2 mm.

The door 104 may be, according to one embodiment, linearly coupled to the tray-less chassis 202 so as to come into contact with and urge the disk drive 120 into the opening and against the backplane as the door 104 is slid shut. Alternatively, the door 104 may be, according to one embodiment, pivotally coupled to the tray-less chassis 202 so as to come into contact with and urge the disk drive 120 into the opening and against the backplane as the door 104 is closed. In so doing, the interior surface 105 of the door 104 may come into contact with and urge the disk drive 120 toward the backplane of the tray-less chassis 202. Near the end of the pivot and as the door 104 is close to latching close, the elastomeric element 106 or 206 may come into contact with a facing surface of the disk drive 120, and compliantly urge the drive's connectors (such as SATA or SAS connectors, for example) against corresponding mating connectors on the backplane of the tray-less chassis. To do so, the elastomeric element 106, 206 may be disposed on and coupled to the interior surface 105 of the door 104 closer to the end of the door 104 that is opposite to the end thereof at which the door 104 pivots. This will ensure that the elastomeric element 106, 206 does not engage the disk drive 120 until nearly the end of the pivot stroke of the door 104. This also ensures that the force exerted on the disk drive by the elastomeric element 106, 206 will be directed substantially parallel to a base of the tray-less chassis, thereby ensuring that the connectors of the disk drive 120 are pushed into the corresponding mating connectors on the backplane at the correct angle.

It is to be noted that the door 104 should be configured to securely urge the disk drive 120 into its opening and to withstand the static load imparted upon it by the enclosed disk drive 120, compressed between the backplane and elastomeric element 106, 206. Moreover, the door 104 may have a plurality of openings defined therein for ventilation and heat dissipation purposes. The door 104 may also be operative as an electro-magnetic interference (EMI) shield or a portion of such a shield.

Figure 3:
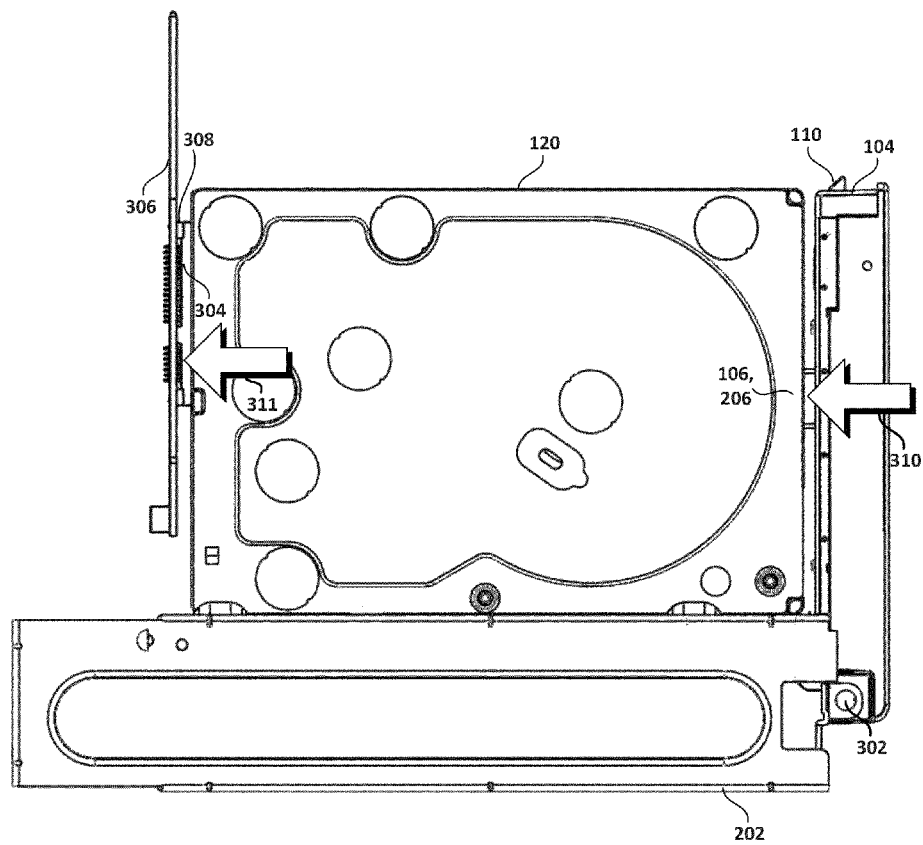
FIG. 3 shows a side view of a portion of the tray-less chassis and a disk drive mounted on the tray-less chassis, with a door in the closed position, according to one embodiment.

FIG. 3 shows a side view of portion of the tray-less chassis 202, a disk drive 120 mounted on the tray-less chassis 202 with the door 104 in the closed position, according to one embodiment. As shown, the door 104 may be coupled to the tray-less chassis 202 at pivot point 302 and may latch to the enclosure 102 using latching mechanism 110. As shown by arrow 310, the biasing force 310 exerted against the disk drive 120 by the elastomeric element 106 or 206 is generally aligned with an insertion direction 311 of a connector 304 of the disk drive 120 against the corresponding mating connector 308 of the backplane 306, when the door 104 is closed.

Figure 4:
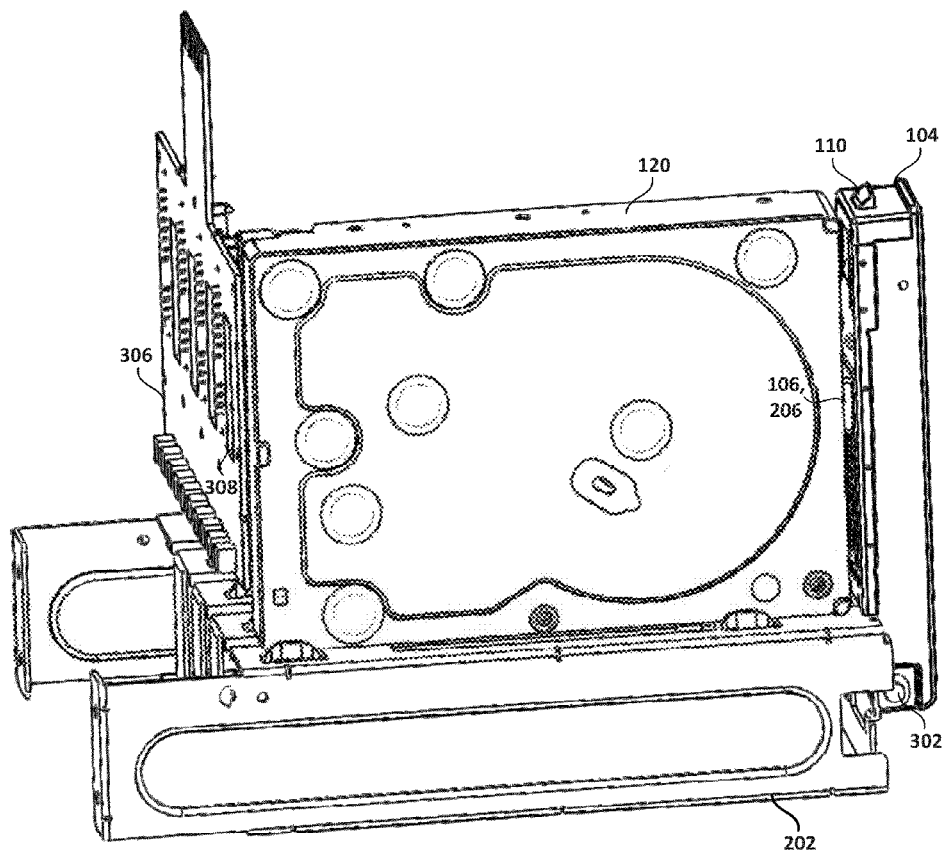
FIG. 4 is a perspective view of a portion of the tray-less chassis, a disk drive mounted on the tray-less chassis against the backplane thereof, with the door in the closed position, according to one embodiment.

FIG. 4 is a perspective view of a portion of the tray-less chassis 202 and a disk drive 120 mounted on the tray-less chassis 202, with the door 104 in the closed position, according to one embodiment. As shown, the tray-less chassis 202 may accommodate four disk drives 120 in total, with the connectors of the disk drives 120 connecting with the corresponding mating connectors 308 of the backplane 306.

In use, the elastomeric element 106,206 provides some selected measure of both compliance and damping, to dampen vibrations imparted to tray-less chassis 202 and enclosure 102 during operation of the contained drives 120. Such vibrations, in the elastomeric element 106, 206 are dissipated as heat. According to one embodiment, to best isolate and dampen such vibrations, the elastomeric element 106,206 may constitute the only point of contact between the disk drive 120 and the door 104. The elastomeric element 106, 206 may be configured to have a loss modulus higher than steel, as defined by the equations:

Storage Modulus: $E' = \sigma_0/\epsilon_0 \cos \delta$

Loss Modulus: $E'' = \sigma_0/\epsilon_0 \sin \delta$

To achieve this and according to one embodiment, the elastomeric element 106, 206 may have a Shore durometer measure of about 20 A to about 100 A. For example, the elastomeric element 106, 206 may have a Shore durometer measure of about 40 A to about 90 A. According to one embodiment, the elastomeric element 106, 206 may have a Shore durometer measure of about 50 A.

The elastomeric element 106, 206, in operation, provides an axial clamping force that acts to dissipate energy imparted to the tray-less chassis 202 through the seek motion of the drive's actuator assembly or assemblies to provide increased servomechanical integrity. Through the use of the elastomeric element 106, 206, enterprise disk drive class performance may be achieved using consumer grade disk drives, thereby resulting in substantial cost savings, particularly in multi drive designs.

While certain embodiments of the inventions have been described, these embodiments have been presented by way of example only, and are not intended to limit the scope of the inventions. Indeed, the novel devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structure, shape, composition and hardness characteristics of the elastomeric element 106, 206 may differ from those shown in the figures and described herein above. Indeed, most any suitable structure that suitably dampens vibrations generated by disk drives may be used. For example, the door(s) 104 could be configured to integrally incorporate damping structures and functionality. Moreover, the door(s) 104 need not be hinged as described and shown in the drawings. Embodiments may also be adapted for single drive enclosures. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A disk drive enclosure, comprising:
a tray-less chassis comprising a backplane and defining an opening configured to receive a disk drive;

a door coupled to the tray-less chassis and configured to enclose the disk drive within the opening when the door is closed, and an elastomeric element, the elastomeric element being configured to bias the disk drive against the backplane when the door is closed and to provide damping and heat dissipation through the elastomeric element having a loss modulus that is higher than a loss modulus of steel so as to dissipate energy imparted to the tray-less chassis during an operation of the disk drive.

2. The disk drive enclosure of claim 1, wherein the door defines an interior surface that faces the opening when the door is closed and wherein the elastomeric element is coupled to the interior surface of the door.

3. The disk drive enclosure of claim 1, wherein the backplane comprises a backplane connector and wherein the elastomeric element is configured to impart a biasing, force against the disk drive that is generally aligned with an insertion direction of a connector of the disk drive against the connector of the backplane, when the door is dosed.

4. The disk drive enclosure of claim 1, wherein the elastomeric element comprises a thermoset polymer.

5. The disk drive enclosure of claim 4, wherein the thermoset polymer comprises at least one of a ethylene propylene diene monomer (EPDM) rubber and a silicone rubber.

6. The disk drive enclosure of claim 1, wherein the elastomeric element defines a compressible wall extending around a perimeter of a center portion to define a void at the center portion that is bounded by the compressible wall.

7. The disk drive enclosure of claim 2, wherein the door is pivotally coupled to the tray-less chassis so that the elastomeric element comes into contact with and urges the disk drive into the opening and against the backplane as the door is closed.

8. The disk drive enclosure of claim 2, wherein the door is pivotally coupled to the tray-less chassis at a first end of the door wherein the elastomeric element is coupled to the door closer to a second end of the door that is opposite the first end.

9. The disk drive enclosure of claim 2, wherein the door is linearly coupled to the tray-less chassis so as to conic into contact with and urge the disk drive into the opening and against the backplane as the door is slid closed.

10. The disk drive enclosure of claim 1, wherein the elastomeric element has a Shore durometer measure of about 20 A to about 100 A.

11. The disk drive enclosure of claim 2, further comprising a layer of adhesive between the elastomeric element and the door.

12. A multi-disk drive enclosure, comprising:
a tray-less chassis comprising a backplane and defining a plurality of openings, each configured to receive a disk drive;
a plurality of doors coupled to the tray-less chassis, each of the plurality of doors being configured to enclose a disk drive within a respective one of the plurality of opening when the door is closed, and
a plurality of elastomeric elements, each elastomeric element being configured to bias a disk drive inserted within a respective one of the plurality of openings against the backplane when the door is closed and to provide damping and heat dissipation through the elastomeric elements having a loss modulus that is higher than a loss modulus of steel so as to dissipate energy imparted to the tray-less chassis during an operation of the disk drive.

13. The multi-disk drive enclosure of claim 12, wherein each of the plurality of doors defines an interior surface that faces a respective one of the plurality of openings when the door is closed and wherein each of the plurality of elastomeric elements is coupled to the interior surface of a respective one of the plurality of doors.

14. The multi-disk drive enclosure of claim 12, wherein the backplane comprises a backplane connector and wherein each of the plurality of the elastomeric elements is configured to impart a biasing force against a disk drive that is generally aligned with an insertion direction of a connector of the disk drive against the connector of the backplane, when the door is closed.

15. The multi-disk drive enclosure of claim 12, wherein each of the plurality of elastomeric elements comprises a thermoset polymer.

16. The multi-disk drive enclosure of claim 15, wherein the thermoset polymer comprises at least one of a ethylene propylene diene monomer (EPDM) rubber and a silicone rubber.

17. The multi-disk drive enclosure of claim 12, wherein each of the plurality of elastomeric elements defines a compressible wall extending around a perimeter of a center portion to define a void at the center portion that is bounded by the compressible wall.

18. The multi-disk drive enclosure of claim 13, wherein each of the plurality of doors is pivotally coupled to the tray-less chassis so that the elastomeric element coupled thereto comes into contact with and urges a disk drive into a respective one of the plurality of openings and against the backplane as the door is closed.

19. The multi-disk drive enclosure of claim 13, wherein each of the plurality of doors is pivotally coupled to the tray-less chassis at a first end of the door wherein each of the plurality of elastomeric elements is coupled to the door closer to a second end of the door that is opposite the first end.

20. The multi-disk drive enclosure of claim 13, wherein each of the plurality of doors is linearly coupled to the tray-less chassis so as to come into contact with and urge the disk drive into the opening and against the backplane as the door is slid closed.

21. The multi-disk drive enclosure of claim 12, wherein at least one of the plurality of elastomeric elements has a Shore durometer measure of about 20 A to about 100 A.

22. The multi-disk drive enclosure of claim 13, wherein each of the plurality of elastomeric elements is coupled to a respective one of the plurality of doors by a layer of adhesive.

* * * * *